US008826379B2

(12) United States Patent
Okuyama et al.

(10) Patent No.: US 8,826,379 B2
(45) Date of Patent: Sep. 2, 2014

(54) ACCESS CONTROL SYSTEM, ACCESS CONTROL METHOD, AND COMMUNICATION TERMINAL

(75) Inventors: Gen Okuyama, Tokyo (JP); Takuya Murakami, Tokyo (JP); Yoshiaki Okuyama, Tokyo (JP)

(73) Assignee: NEC Corporation, Tokyo (JP)

( * ) Notice: Subject to any disclaimer, the term of this patent is extended or adjusted under 35 U.S.C. 154(b) by 393 days.

(21) Appl. No.: 13/062,256

(22) PCT Filed: Sep. 30, 2009

(86) PCT No.: PCT/JP2009/067040
§ 371 (c)(1),
(2), (4) Date: Mar. 4, 2011

(87) PCT Pub. No.: WO2010/038783
PCT Pub. Date: Apr. 8, 2010

(65) Prior Publication Data
US 2011/0162045 A1      Jun. 30, 2011

(30) Foreign Application Priority Data
Sep. 30, 2008   (JP) ................................. 2008-252681

(51) Int. Cl.
*G06F 7/00* (2006.01)
(52) U.S. Cl.
CPC ....................................... *G06F 7/00* (2013.01)
USPC .......................................................... 726/3
(58) Field of Classification Search
CPC ....................................................... G06F 7/00
USPC ............................................................ 726/3
See application file for complete search history.

(56) References Cited

U.S. PATENT DOCUMENTS

2003/0078894 A1* 4/2003 Kon ................................ 705/64
2003/0105960 A1* 6/2003 Takatori et al. ............... 713/168

FOREIGN PATENT DOCUMENTS

| CN | 1274127 A | 11/2000 |
|---|---|---|
| CN | 1695343 A | 11/2005 |
| CN | 101151602 A | 3/2008 |
| JP | 2003-67326 A | 3/2003 |
| JP | 2004140563 A | 5/2004 |
| JP | 2004-336741 A | 11/2004 |
| JP | 2004320369 A | 11/2004 |
| JP | 2005-100440 A | 4/2005 |
| JP | 2007-519308 A | 7/2007 |
| JP | 2008-99245 A | 4/2008 |
| WO | 02/01376 A1 | 1/2002 |
| WO | 2008/153069 A1 | 12/2008 |
| WO | 2010/038726 A1 | 4/2010 |

OTHER PUBLICATIONS

International Search Report for PCT/JP2009/067040 mailed Dec. 8, 2009.

(Continued)

*Primary Examiner* — Jacob Lipman
(74) *Attorney, Agent, or Firm* — Sughrue Mion, PLLC

(57) ABSTRACT

Collation information (22) of data (21) is acquired via a high-secure network (3). The data (21) is acquired via a low-secure network (4). The acquired collation information (22) and data (21) are collated. If the collation result is "match", it is determined that the low-secure network (4) is not disguised, and access to the low-secure network (4) is permitted. The use of the downloaded data (21) on the high-secure network (3) and low-secure network (4) is permitted.

16 Claims, 14 Drawing Sheets

(56) References Cited

OTHER PUBLICATIONS

Sun's Response to the DNS Spoofing Attack, 1996, (http://www.cs.princeton.edu/sip/news/sun-02-22-96.html).
Deborah Russell, et al. "Computer Security Basics," ASCII Corporation, vol. 1, Jul. 11, 1997, O'Reilly and Associates, Inc., ISBN4-7561-0299-9.
Chinese Office Action for CN Application No. 200980138675.X issued on Jun. 5, 2013 with English Translation.
Japanese Office Action for JP Application No. 2010-531883 mailed on Jul. 2, 2013 with English Translation.

* cited by examiner

FIG. 9A

RELIABILITY INFORMATION DB

TB1:
| DATA IDENTIFIER | NW IDENTIFIER |
|---|---|
| #DA | HNW / LNW1 |

TB2:
| NW IDENTIFIER | PERMISSION/ INHIBITION OF CONNECTION |
|---|---|
| LNW1 | ○ |

FIG. 9B

RELIABILITY INFORMATION DB

TB1:
| DATA IDENTIFIER | NW IDENTIFIER |
|---|---|
| #DA | HNW / LNW1 |
| #DB | — |

TB2:
| NW IDENTIFIER | PERMISSION/ INHIBITION OF CONNECTION |
|---|---|
| LNW1 | ○ |
| LNW2 | × |

FIG. 9C

RELIABILITY INFORMATION DB

TB1:
| DATA IDENTIFIER | NW IDENTIFIER |
|---|---|
| #DA | HNW / LNW1 |
| #DB | — |
| #DC | — |

TB2:
| NW IDENTIFIER | PERMISSION/ INHIBITION OF CONNECTION |
|---|---|
| LNW1 | ○ |
| LNW2 | × |
| LNW3 | × |

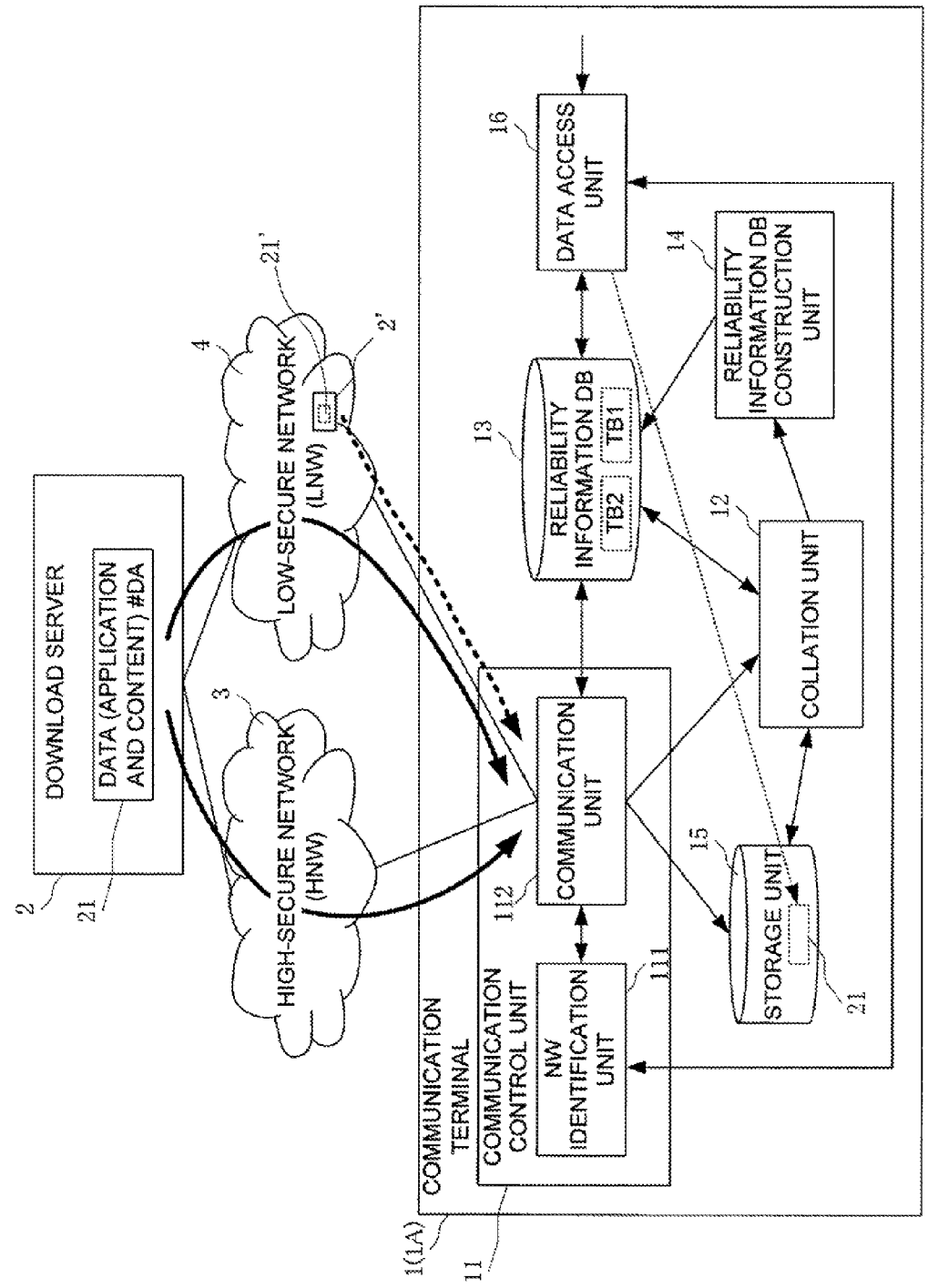

FIG. 12

| RELIABILITY INFORMATION DB | |
|---|---|
| DATA IDENTIFIER | NW IDENTIFIER |
| #DA | HNW |

| NW IDENTIFIER | PERMISSION/ INHIBITION OF CONNECTION |
|---|---|
|  |  |

FIG. 13

| RELIABILITY INFORMATION DB | |
|---|---|
| DATA IDENTIFIER | NW IDENTIFIER |
| #DA | HNW / LNW |

| NW IDENTIFIER | PERMISSION/ INHIBITION OF CONNECTION |
|---|---|
| LNW | ○ |

FIG. 14

| RELIABILITY INFORMATION DB | |
|---|---|
| DATA IDENTIFIER | NW IDENTIFIER |
| #DA | HNW |

| NW IDENTIFIER | PERMISSION/ INHIBITION OF CONNECTION |
|---|---|
| LNW | × |

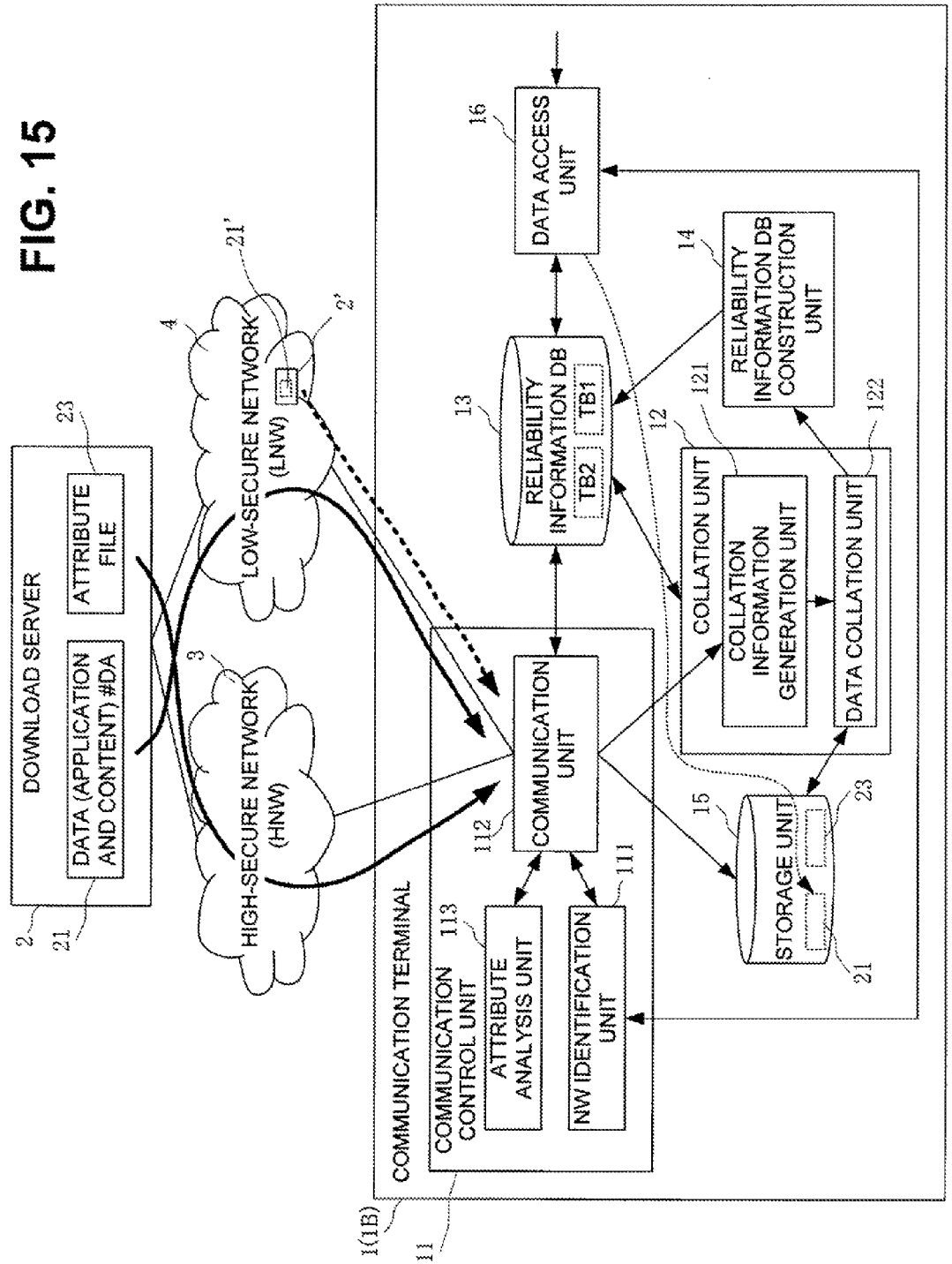

ACCESS CONTROL SYSTEM, ACCESS CONTROL METHOD, AND COMMUNICATION TERMINAL

The present application is the National Phase of PCT/JP2009/067040, filed Sep. 30, 2009, which claims priority based on Japanese patent application No. 2008-252681 filed on Sep. 30, 2008.

TECHNICAL FIELD

The present invention relates to an access control system, access control method, and communication terminal for controlling access to data such as an application or content, and a network.

BACKGROUND ART

Recently, it is becoming popular for communication terminals to have a plurality of wireless communication means, and switch and use the connection network, as needed. For example, a communication terminal which has a means for connecting to a cellular network and a means for connecting to a wireless LAN, and connects to a cellular network outdoors and a wireless LAN indoors has come into practical use.

In this case, the communication terminal switches between various networks or simultaneously uses them. There are various networks to be connected, and the respective networks greatly differ in operation policy. For example, an IP network provided by a cellular network provider and an office intranet introduce authentication and encryption means, and are regarded as very secure networks (high-security network). To the contrary, a free wireless LAN spot has neither an authentication nor encryption means, and even an unsecured network (low-security network) exists.

In this specification, a network such as an IP network provided by a cellular network provider or an office intranet mentioned above will be called a high-secure network, and a network whose Web server or DNS may be spoofed or one on which communication contents may be analyzed owing to lack of encryption will be called a low-secure network.

Recent communication terminals can download data such as an application or content from a server via a network, and receive various services using the downloaded data. An example of the application is a Java® application for cell phones. When such a communication terminal switches between high- and low-secure networks or simultaneously uses them, a security threat occurs.

For example, assume that a malicious application exists on a low-secure network, and a communication terminal downloads this application and executes it while connecting to a high-secure network. Then, the malicious application may attack the high-secure network, steal information, or execute destruction within the network.

A Java applet application will be considered. As for the Java applet application, this application can generally communicate with only a site from which it was downloaded. For example, an application downloaded from "http://www.example.com" can communicate with only "www.example.com" under restrictions by "Java VM".

In this case, a DNS on a high-secure network is reliable, so the application can communicate with an intended server (www.example.com). However, on a low-secure network, not only an application and Web server but also even a DNS are unreliable. A malicious network administrator may set up a malicious DNS server, and cause a communication terminal to download an application from the spoofed server.

For example, assume that a communication terminal downloads an application from a Web server spoofed as "http://www.some-secure-server.com". This application is permitted to communicate with "www.some-secure-server.com". If a server having the same DNS name as this exists on a high-secure network, the malicious application can undesirably communicate with this server and attack it. That is, the application on the low-secure network can attack the server on the high-secure network. This is a serious problem.

To the contrary, assume that a communication terminal downloads an authentic application or content from "http://www.some-secure-server.com" on a high-secure network. If this communication terminal connects to the aforementioned malicious network, the application or content is connected to the spoofed server, and the communication contents may be analyzed. That is, the communication contents of the application or content on the high-secure network may be exposed to the low-secure network and analyzed. This may be a serious problem especially for an application closed in the high-secure network environment.

As a measure against such a security threat, an HTTPS (Hypertext Transfer Protocol Security) server or the like may be installed. However, a certificate needs to be acquired, and server settings and the like are required, raising the cost. It is difficult in terms of the cost to use the HTTPS for freeware or open information created by an individual, unlike a content provider who can gain an income from an application or content.

Considering this, for example, reference 1 (Japanese Patent Laid-Open No. 2004-320369) discloses a method of comparing a communication network corresponding to an application with a communication network during connection, and if they do not coincide with each other, restricting the application function.

By making an application to correspond to a communication network for use in this way, an application on a low-secure network cannot access a high-secure network, and an application on a high-secure network cannot access a low-secure network. The security problem can therefore be solved.

However, some applications can use both high-secure/low-secure networks without any problem. An example is a communication application residing on a server accessible via both high-secure/low-secure networks. This application can be accessed via a high-secure network, and at least the DNS is reliable. Also, this application can be accessed via a low-secure network and is not one closed in the high-secure network environment. For this reason, this application does not require the above restrictions originally.

However, the above solution inhibits this application from using both of the networks. Also, this problem occurs similarly even when an application is replaced with another data such as a content in reference 1 described above.

DISCLOSURE OF INVENTION

Problems to be Solved by the Invention

Under the circumstance, a mechanism for authenticating a server is required to enable the use of data such as an application or content on a plurality of networks while maintaining security. More specifically, the origin of data is checked, and if it is certified that the server is not spoofed, i.e., if it is certified that the network is not disguised, the use of a plurality of networks can be permitted without any problem. However, a mechanism for determining whether a network is disguised has not existed conventionally.

The present invention has been made to solve the above problems, and has as its exemplary object to provide an access control system, access control method, and communication terminal capable of determining whether a network is disguised.

It is another exemplary object to provide an access control system, access control method, and communication terminal for enabling the use of data on a plurality of networks while maintaining security.

Means of Solution to the Problems

To achieve the above object, according to the present invention, a communication terminal in an access control system comprising a first network, a second network lower in security than the first network, and a communication terminal connectable to the first network and the second network, comprises collation means for collating collation information acquired for data from one network out of the first network and the second network with data acquired from the other network, and reliability information DB construction means for constructing, based on a collation result of the collation means, a reliability information DB as a database of information indicating reliability of access to a resource.

According to the present invention, the communication terminal collates collation information acquired for data from either the first network (high-secure network) or second network (low-secure network) with the data acquired from the other network. Based on the result of collation between the collation information of the data and the data, a reliability information DB is constructed as the database of information indicating the reliability of access to a resource. In the present invention, "data" means all kinds of data acquired by a communication terminal via a network, including an application and content.

Effects of the Invention

According to the present invention, the communication terminal collates collation information acquired for data from either the first network (high-secure network) or second network (low-secure network) with the data acquired from the other network. Based on the collation result, a reliability information DB is constructed as the database of information indicating the reliability of access to a resource. This enables determining whether the network is disguised, determining whether to permit/inhibit access to downloaded data, and determining whether to permit/inhibit access to a network. Data can therefore be used on a plurality of networks while maintaining security.

BRIEF DESCRIPTION OF DRAWINGS

FIG. 9A is a view showing a state in which the database of reliability information is constructed in the reliability information DB in the access control system shown in FIG. 8;

FIG. 9B is a view showing a state in which the database of reliability information is constructed in the reliability information DB in the access control system shown in FIG. 8;

FIG. 9C is a view showing a state in which the database of reliability information is constructed in the reliability information DB in the access control system shown in FIG. 8;

FIG. 10 is a view showing the configuration of another exemplary embodiment (second exemplary embodiment) of an access control system according to the present invention;

FIG. 12 is a view exemplifying write of reliability information in the reliability information DB when data is acquired for the first time using a high-secure network in the access control system according to the second exemplary embodiment;

FIG. 13 is a view exemplifying write of reliability information in the reliability information DB when the collation result is "match" in the access control system according to the second exemplary embodiment;

FIG. 14 is a view exemplifying write of reliability information in the reliability information DB when the collation result is "mismatch" in the access control system according to the second exemplary embodiment;

FIG. 15 is a view showing the configuration of still another exemplary embodiment (third exemplary embodiment) of an access control system according to the present invention;

BEST MODE FOR CARRYING OUT THE INVENTION

The present invention will be described below with reference to the accompanying drawings.

First Exemplary Embodiment

Figure 1:
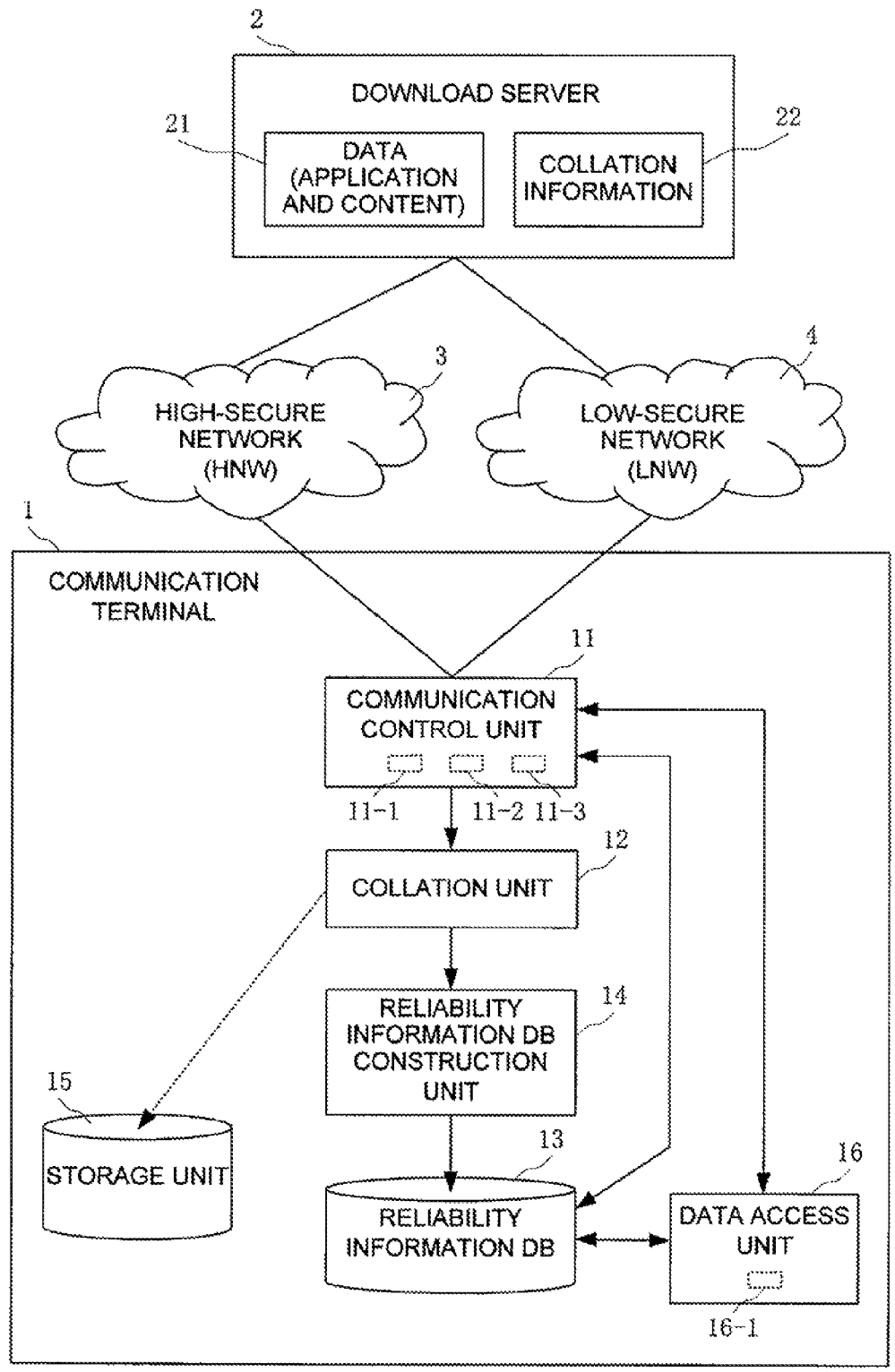
FIG. 1 is a view showing the configuration of an exemplary embodiment (first exemplary embodiment) of an access control system according to the present invention.

FIG. 1 is a view showing the configuration of an exemplary embodiment (first exemplary embodiment) of an access control system according to the present invention. In FIG. 1, reference numeral 1 denotes a communication terminal; and 2, a download server.

The communication terminal 1 includes a communication control unit 11, collation unit 12, reliability information DB 13, reliability information DB construction unit 14, and storage unit 15. The download server (to be simply referred to as a server) 2 includes data 21 such as an application or content, and collation information (e.g., hash value) 22 of the data 21.

The server 2 is connected to a high-secure network 3 and low-secure network 4. The communication terminal 1 can access the server 2 via the communication control unit 11 using at least either the high-secure network 3 or low-secure network 4.

There are various networks, and they are roughly classified into two types: the high-secure network 3 and the low-secure network 4 lower in security than the high-secure network 3. The high-secure network 3 is a network whose security is ensured to a certain degree, and includes an IP network provided by a cellular network provider and an office LAN. In these networks, servers such as a DNS server and Proxy server present within them can be considered to be reliable.

In contrast, the low-secure network 4 includes a free wireless LAN spot and the like. In these networks, servers within them are considered to be less reliable. For example, it is easy to set a free wireless LAN spot where a DNS server is installed with a DNS name intentionally spoofed by a malicious person.

In the system of the first exemplary embodiment, the communication control unit 11 of the communication terminal 1 acquires the collation information 22 via either the high-secure network 3 or low-secure network 4, and acquires the data 21 via the other network. The collation unit 12 of the communication terminal 1 collates the acquired collation information 22 and data 21.

A method of acquiring the collation information 22 via the high-secure network 3 and acquiring the data 21 via the low-secure network 4 is defined as the first method of the first exemplary embodiment. A method of acquiring the data 21 via the high-secure network 3 and acquiring the collation information 22 via the low-secure network 4 is defined as the second method of the first exemplary embodiment. These methods will be explained.

First Method of First Exemplary Embodiment

Figure 2:
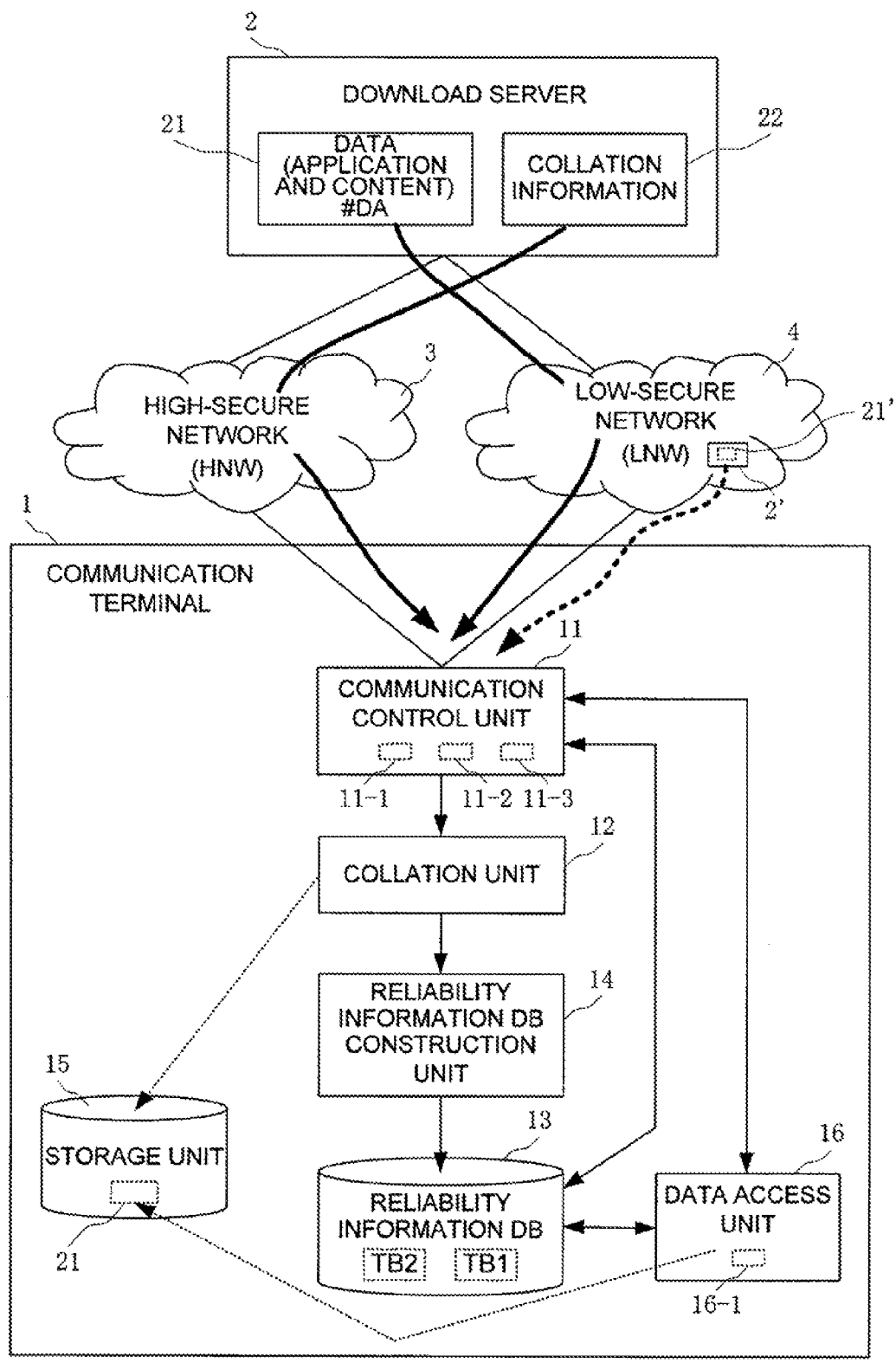
FIG. 2 is a view for explaining the first method of the first exemplary embodiment.

In the first method of the first exemplary embodiment, the communication control unit 11 of the communication terminal 1 acquires the collation information 22 via the high-secure network 3, and acquires the data 21 via the low-secure network 4 (see FIG. 2). The communication control unit 11 simultaneously acquires the collation information 22 and data 21. More specifically, when acquiring the collation information 22 first, immediately after the communication control unit 11 acquires the collation information 22 via a collation information acquisition unit 11-1, it acquires the data 21 via a data acquisition unit 11-2.

In the communication terminal 1, the collation unit 12 collates the collation information (hash value in this example) 22 acquired via the high-secure network 3 with the data 21 acquired via the low-secure network 4. In this case, the collation unit 12 generates a hash value from the data 21 acquired via the low-secure network 4, and compares it with the collation information (hash value) 22 acquired via the high-secure network 3.

If the collation result is "match", the collation unit 12 determines that the data 21 acquired from the low-secure network 4 is reliable. If the collation result is "mismatch", the collation unit 12 determines that the data 21 acquired from the low-secure network 4 is unreliable.

Reliable data means data 21 acquired from the unspoofed server 2, i.e., data 21 acquired from the undisguised low-secure network 4. Unreliable data means data 21' acquired from a spoofed server 2', i.e., data 21' acquired from a disguised low-secure network 4.

If the collation result is "match", the collation unit 12 saves the data 21 acquired from the low-secure network 4 in the storage unit 15. If the collation result is "mismatch", the data 21' acquired from the low-secure network 4 is unreliable, and the collation unit 12 discards it without saving it in the storage unit 15.

[Case in which Collation Result is "Match"]

Figure 3:
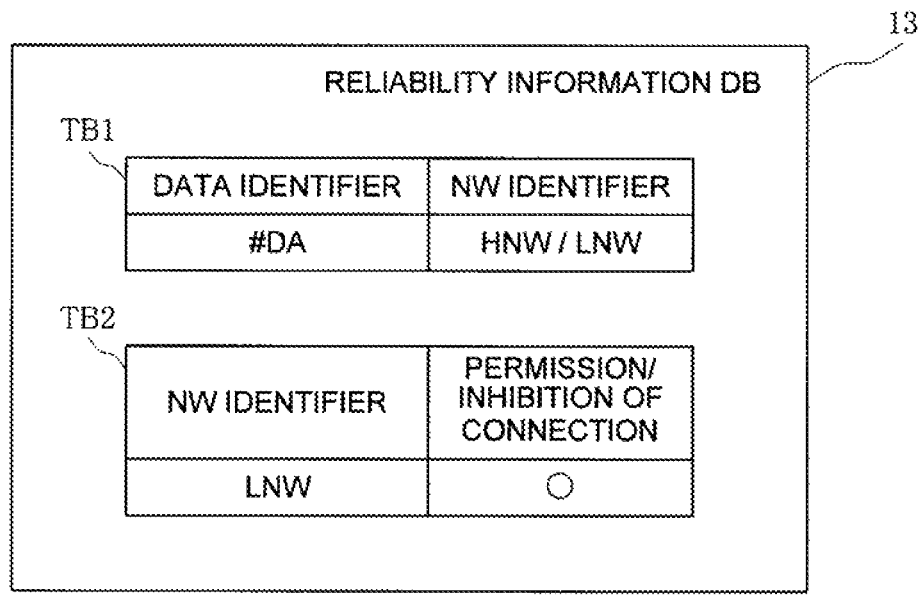
FIG. 3 is a view exemplifying write of reliability information in a reliability information DB when the collation result is "match" in the first method of the first exemplary embodiment.

The collation result in the collation unit 12 is sent to the reliability information DB construction unit 14. If the collation result in the collation unit 12 is "match", the reliability information DB construction unit 14 uses the data 21 acquired from the low-secure network 4 as a resource, and writes, as information indicating the reliability of access to this resource in a table TB1 within the reliability information DB 13, the correspondence between the identifier of the data (data identifier), the identifier of the network (NW identifier) used to acquire collation information of the data, and the identifier of the network (NW identifier) used to acquire the data. In this example, the data identifier #DA of the data 21, the NW identifier HNW of the high-secure network 3, and the NW identifier LNW of the low-secure network 4 are combined and written in the table TB1 (see FIG. 3) within the reliability information DB 13.

If the collation result in the collation unit 12 is "match", the reliability information DB construction unit 14 uses the low-secure network 4 as a resource, and writes the correspondence between the identifier of the low-secure network 4 and connection permission/inhibition information in a table TB2 within the reliability information DB 13 as information indicating the reliability of access to this resource. In this example, the NW identifier LNW of the low-secure network 4 and information ("○") indicating permission of connection are paired and written in the table TB2 (see FIG. 3).

[Access to Data]

By looking up the table TB1 (FIG. 3) in the reliability information DB 13, a data access unit 16 permits access to the data 21 in the storage unit 15 that has been downloaded via the low-secure network 4, upon connection to the high-secure network 3 and connection to the low-secure network 4. A data access permission/inhibition determination unit 16-1 makes this determination.

[Access to Network]

The communication control unit 11 permits access to the low-secure network 4 by looking up the table TB2 (FIG. 3) in the reliability information DB 13. A network access permission/inhibition determination unit 11-3 makes this determination. As for the high-secure network 3, reliability is considered to be high, and access to this network is always permitted without referring to information in the reliability information DB 13.

In this manner, according to the first method of the first exemplary embodiment, when the collation result in the collation unit 12 is "match", i.e., when it is determined that the low-secure network 4 is not disguised, the communication terminal 1 can access both the high-secure network 3 and low-secure network 4. Also, the communication terminal 1 can access the data 21 in the storage unit 15 upon connection to either network. The data 21 can be used on both the high-secure network 3 and low-secure network 4 while maintaining security.

[Case in which Collation Result is "Mismatch"]

Figure 4:
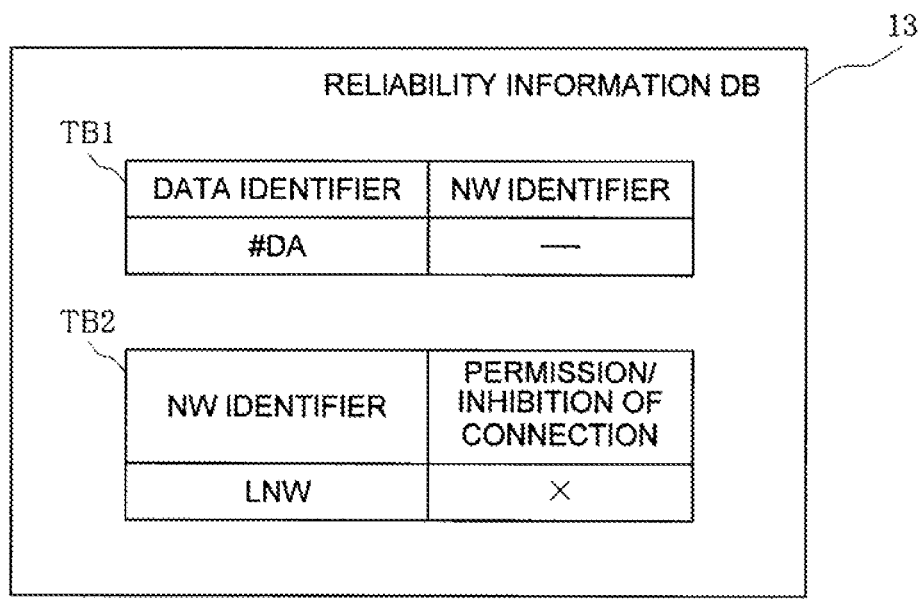
FIG. 4 is a view exemplifying write of reliability information in the reliability information DB when the collation result is "mismatch" in the first method of the first exemplary embodiment.

The collation result in the collation unit 12 is sent to the reliability information DB construction unit 14. If the collation result in the collation unit 12 is "mismatch", the reliability information DB construction unit 14 writes, in the table TB1 within the reliability information DB 13, the correspondence between the identifier of the data 21' (data identifier) acquired from the low-secure network 4 and information indicating that there is no available network. In this example, the data identifier #DA of the data 21' and information ("−") indicating that there is no available network are made to correspond to each other, and written in the table TB1 within the reliability information DB 13 (see FIG. 4).

If the collation result in the collation unit 12 is "mismatch", the reliability information DB construction unit 14 uses the low-secure network 4 as a resource, and writes the correspondence between the identifier of the low-secure network 4 and connection permission/inhibition information in the table TB2 within the reliability information DB 13 as information indicating the reliability of access to this resource. In this example, the NW identifier ZNW of the low-secure network 4 and information ("x") indicating inhibition of connection are paired and written in the table TB2 (see FIG. 4).

[Access to Network]

The communication control unit 11 inhibits access to the low-secure network 4 by looking up the table TB2 (FIG. 4) in the reliability information DB 13. The network access permission/inhibition determination unit 11-3 makes this determination. As for the high-secure network 3, reliability is considered to be high, and access to this network is always permitted without referring to information in the reliability information DB 13.

In this fashion, according to the first method of the first exemplary embodiment, when the collation result in the collation unit 12 of the communication terminal 1 is "mismatch", i.e., when it is determined that the low-secure network 4 is disguised, access to the disguised low-secure network 4 is inhibited. Only access to the high-secure network 3 is permitted, ensuring security.

In the above description, when the collation result in the collation unit 12 is "mismatch", the data 21' acquired from the low-secure network 4 is discarded. Alternatively, the data 21' acquired from the low-secure network 4 may be saved in the storage unit 15. In this case, the data 21' is unreliable, but can be checked later by saving it in the storage unit 15 of the communication terminal 1. When the data 21' is saved in the storage unit 15, the use of the data 21' on the high-secure network 3 and low-secure network 4 is inhibited by looking up the table TB1 (FIG. 4) in the reliability information DB 13. The data access permission/inhibition determination unit 16-1 makes this determination.

Second Method of First Exemplary Embodiment

Figure 5:
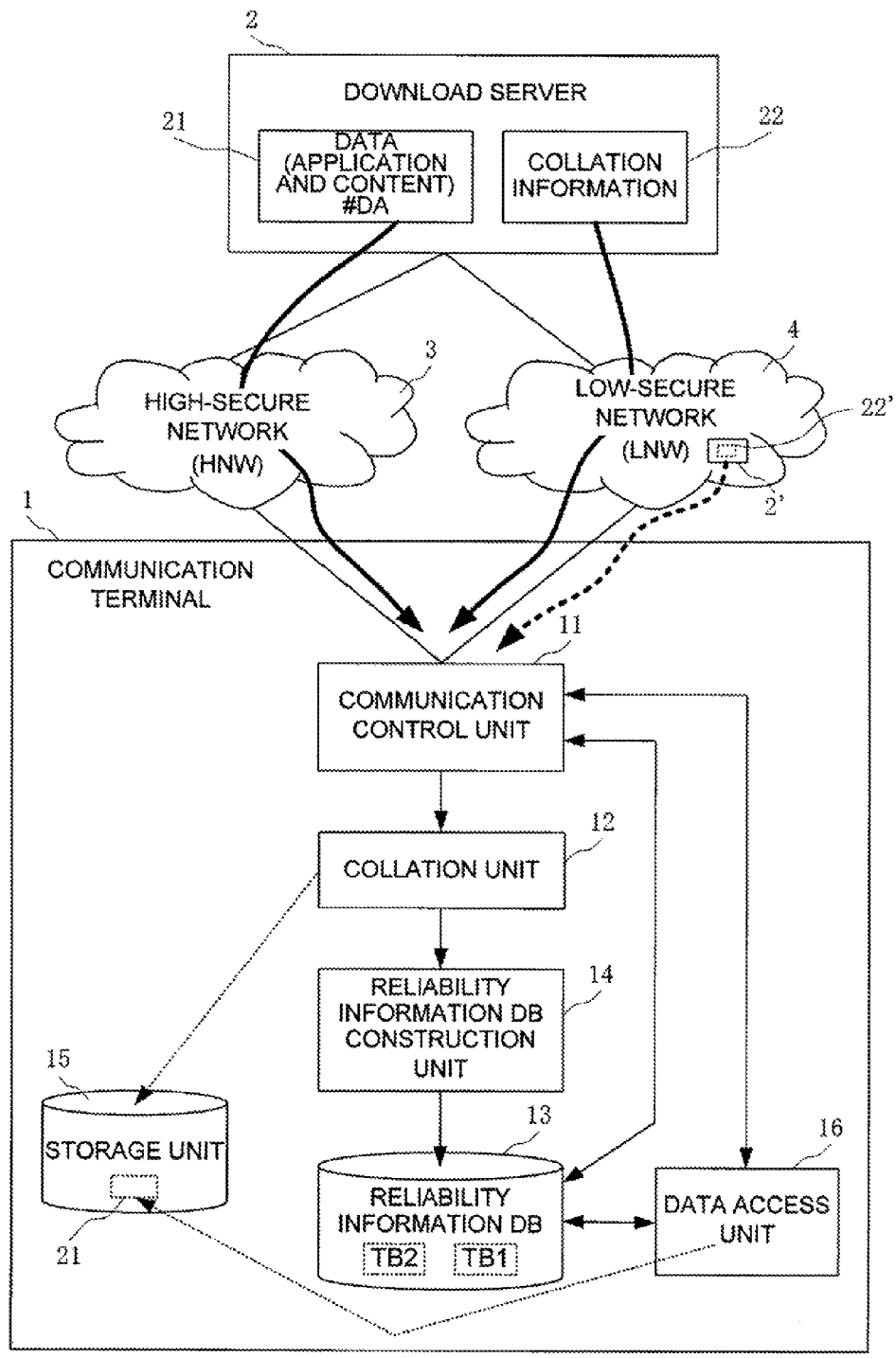
FIG. 5 is a view for explaining the second method of the first exemplary embodiment.

In the second method of the first exemplary embodiment, the communication control unit 11 of the communication terminal 1 acquires the data 21 via the high-secure network 3, and acquires the collation information 22 via the low-secure network 4 (see FIG. 5). The communication control unit 11 simultaneously acquires the collation information 22 and data 21. More specifically, when acquiring the data 21 first, immediately after the communication control unit 11 acquires the data 21 via the data acquisition unit 11-2, it acquires the collation information 22 via the collation information acquisition unit 11-1.

In the communication terminal 1, the collation unit 12 collates the collation information (hash value in this example) 22 acquired via the low-secure network 4 with the data 21 acquired via the high-secure network 3. In this case, the collation unit 12 generates a hash value from the data 21 acquired via the high-secure network 3, and collates it with the collation information 22 (hash value) acquired via the low-secure network 4.

If the collation result is "match", the collation unit 12 determines that the collation information 22 acquired from the low-secure network 4 is reliable. If the collation result is "mismatch", the collation unit 12 determines that the collation information 22 acquired from the low-secure network 4 is unreliable.

Reliable collation information means collation information 22 acquired from the unspoofed server 2, i.e., collation information 22 acquired from the undisguised low-secure network 4. Unreliable collation information means collation information 22' acquired from the spoofed server 2', i.e., collation information 22' acquired from the disguised low-secure network 4.

In this case, the collation unit 12 saves the data 21 acquired from the high-secure network 3 in the storage unit 15 regardless of whether the collation result is "match" or "mismatch". Since the high-secure network 3 is highly reliable, even if the collation result in the collation unit 12 is "mismatch", the data 21 acquired from the high-secure network 3 is saved in the storage unit 15.

[Case in which Collation Result is "Match"]

Figure 6:
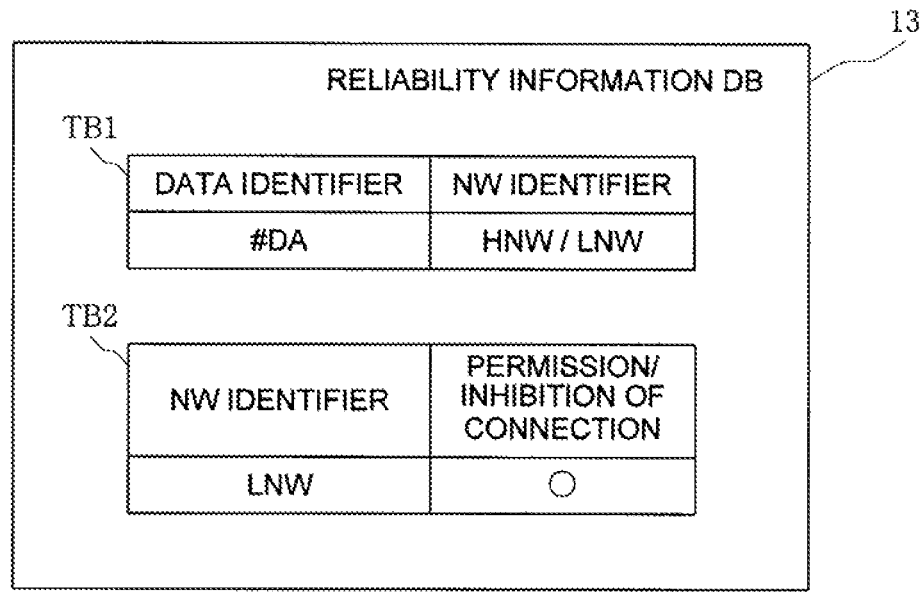
FIG. 6 is a view exemplifying write of reliability information in the reliability information DB when the collation result is "match" in the second method of the first exemplary embodiment.

The collation result in the collation unit 12 is sent to the reliability information DB construction unit 14. If the collation result in the collation unit 12 is "match", the reliability information DB construction unit 14 uses the data 21 acquired from the high-secure network 3 as a resource, and writes, as information indicating the reliability of access to this resource in the table TB1 within the reliability information DB 13, the correspondence between the identifier of the data (data identifier), the identifier of the network (NW identifier) used to acquire collation information of the data, and the identifier of the network (NW identifier) used to acquire the data. In this example, the data identifier #DA of the data 21, the NW identifier HNW of the high-secure network 3, and the NW identifier LNW of the low-secure network 4 are combined and written in the table TB1 (see FIG. 6) within the reliability information DB 13.

If the collation result in the collation unit 12 is "match", the reliability information DB construction unit 14 uses the low-secure network 4 as a resource, and writes the correspondence between the identifier of the low-secure network 4 and connection permission/inhibition information in the table TB2 within the reliability information DB 13 as information indicating the reliability of access to this resource. In this example, the NW identifier LNW of the low-secure network 4 and information ("○") indicating permission of connection are paired and written in the table TB2 (see FIG. 6).

[Access to Data]

By looking up the table TB1 (FIG. 6) in the reliability information DB 13, the data access unit 16 permits access to the data 21 in the storage unit 15 that has been downloaded via the high-secure network 3, upon connection to the high-secure network 3 and connection to the low-secure network 4. The data access permission/inhibition determination unit 16-1 makes this determination.

[Access to Network]

The communication control unit 11 permits access to the low-secure network 4 by looking up the table TB2 (FIG. 6) in the reliability information DB 13. The network access permission/inhibition determination unit 11-3 makes this determination. As for the high-secure network 3, reliability is considered to be high, and access to this network is always permitted without referring to information in the reliability information DB 13.

In this way, according to the second method of the first exemplary embodiment, when the collation result in the collation unit 12 is "match", i.e., when it is determined that the low-secure network 4 is not disguised, the communication terminal 1 can access both the high-secure network 3 and low-secure network 4. Further, the communication terminal 1 can access the data 21 in the storage unit 15 upon connection to either network. The data 21 can be used on both the high-secure network 3 and low-secure network 4 while maintaining security.

[Case in which Collation Result is "Mismatch"]

Figure 7:
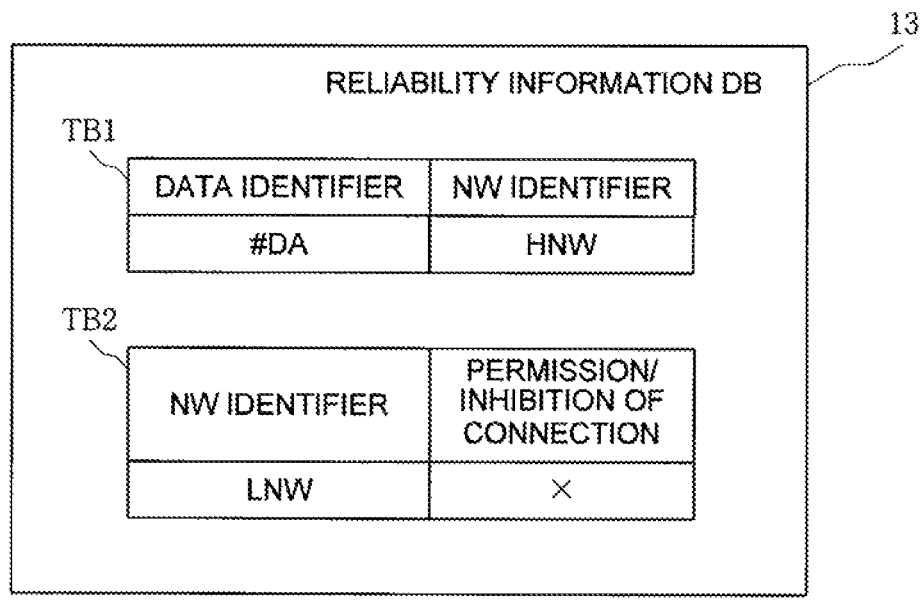
FIG. 7 is a view exemplifying write of reliability information in the reliability information DB when the collation result is "mismatch" in the second method of the first exemplary embodiment.

The collation result in the collation unit 12 is sent to the reliability information DB construction unit 14. If the collation result in the collation unit 12 is "mismatch", the reliability information DB construction unit 14 uses the data 21 acquired from the high-secure network 3 as a resource, and writes the correspondence between the identifier of the data (data identifier) and the identifier of the network (NW identifier) used to acquire the data in the table TB1 within the reliability information DB 13 as information indicating the reliability of access to this resource. In this example, the data identifier #DA of the data 21 and the NW identifier HNW of the high-secure network 3 used to acquire the data 21 are made to correspond to each other, and written in the table TB1 within the reliability information DB 13 (see FIG. 7).

If the collation result in the collation unit 12 is "mismatch", the reliability information DB construction unit 14 uses the low-secure network 4 as a resource, and writes the correspondence between the identifier of the low-secure network 4 and connection permission/inhibition information in the table TB2 within the reliability information DB 13 as information indicating the reliability of access to this resource. In this example, the NW identifier LNW of the low-secure network 4 and information ("x") indicating inhibition of connection are paired and written in the table TB2 (see FIG. 7).

[Access to Data]

By looking up the table TB1 (FIG. 7) in the reliability information DB 13, the data access unit 16 permits access to the data 21 in the storage unit 15 that has been downloaded via the high-secure network 3, only upon connection to the high-secure network 3. The data access permission/inhibition determination unit 16-1 makes this determination.

[Access to Network]

The communication control unit 11 inhibits access to the low-secure network 4 by looking up the table TB2 (FIG. 7) in the reliability information DB 13. The network access permission/inhibition determination unit 11-3 makes this determination. As for the high-secure network 3, reliability is considered to be high, and access to this network is always permitted without referring to information in the reliability information DB 13.

In this manner, according to the second method of the first exemplary embodiment, when the collation result in the collation unit 12 is "mismatch", i.e., when it is determined that the low-secure network 4 is disguised, access to the disguised low-secure network 4 is inhibited. Hence, only access to the high-secure network 3 is permitted, ensuring security. Only upon connection to the high-secure network 3, access to the data 21 in the storage unit 15 is permitted, and the data 21 can be used only on the high-secure network 3.

Note that the above-described first and second methods of the first exemplary embodiment always permit access to the high-secure network 3 without referring to information in the reliability information DB 13. However, as for the high-secure network 3, similar to the low-secure network 4, the NW identifier HNW and information ("○") indicating permission of connection may be paired and written in the table TB2, and whether to permit/inhibit access to the high-secure network 3 may be determined by looking up the table TB2.

The above-described second method of the first exemplary embodiment simultaneously acquires the data 21 via the high-secure network 3 and acquires the collation information 22 via the low-secure network 4. Alternatively, after the data 21 acquired via the high-secure network 3 is saved in the storage unit 15, when, for example, the communication terminal 1 enters the communication area of the low-secure network 4, the collation information 22 may be acquired via the low-secure network 4 to collate the acquired collation information 22 with the data 21 saved in the storage unit 15.

Figure 8:
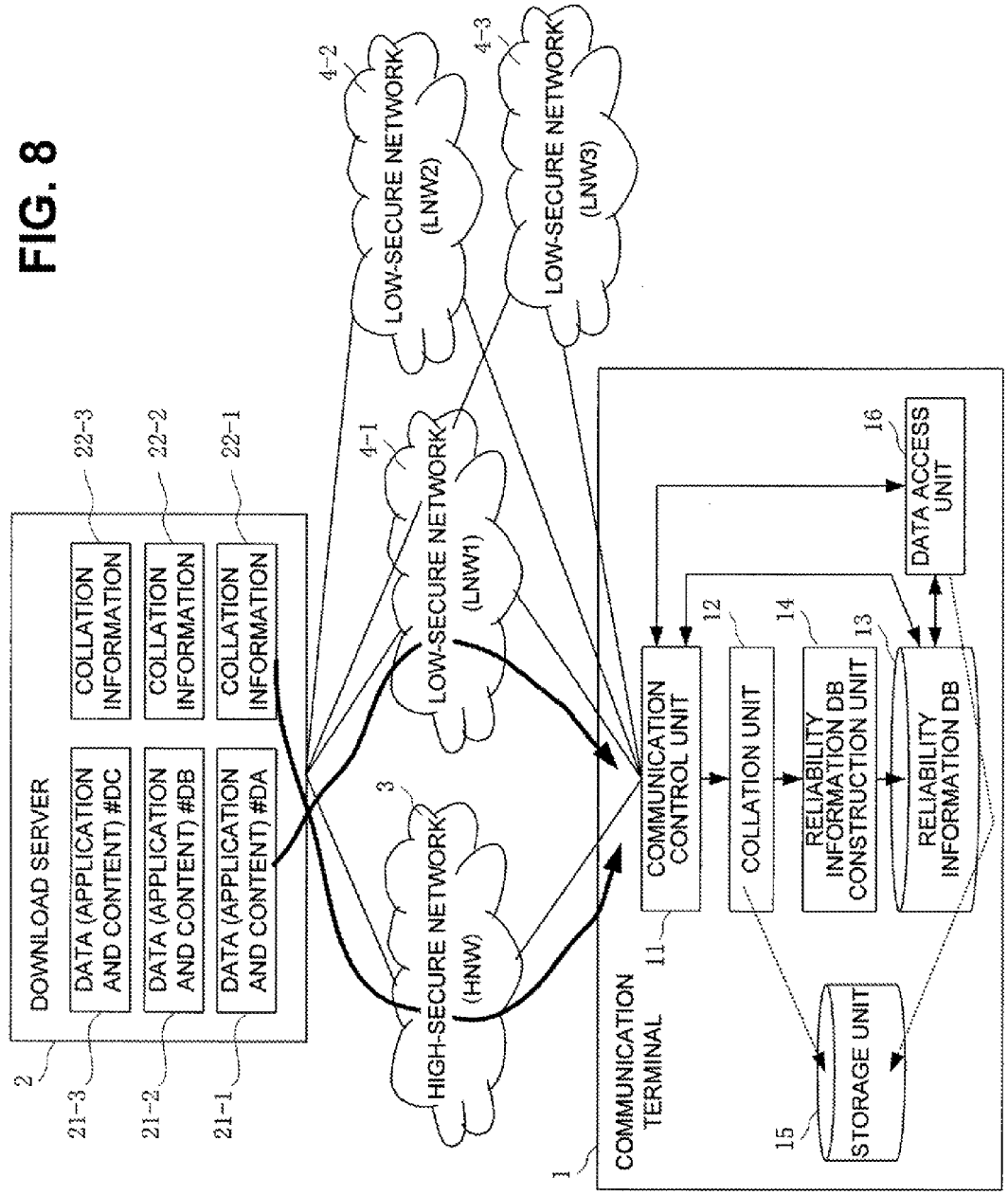
FIG. 8 is a view exemplifying an access control system when a plurality of low-secure networks exist.

The first and second methods of the first exemplary embodiment have been described using an example in which the number of low-secure networks 4 is one. In practice, a plurality of low-secure networks 4 exist. FIG. 8 shows a case in which three low-secure networks 4-1, 4-2, and 4-3 exist.

In the access control system shown in FIG. 8, for example, when the first method of the first exemplary embodiment is employed, the database of reliability information is constructed as follows in the reliability information DB 13 of the communication terminal 1.

Referring to FIG. 8, the NW identifier of the low-secure network 4-1 is LNW1, that of the low-secure network 4-2 is LNW2, and that of the low-secure network 4-3 is LNW3. The server 2 has data 21-1, 21-2, and 21-3 such as an application and content, and has collation information 22-1, 22-2, and 22-3 as the hash values of the data 21-1, 21-2, and 21-3. The data identifier of the data 21-1 is #DA, that of the data 21-2 is #DB, and that of the data 21-3 is #DC.

In this case, the communication terminal 1 acquires the collation information 22-1 via the high-secure network 3, acquires the data 21-1 via the low-secure network 4-1, and collates the acquired collation information 22-1 and data 21-1.

If the collation result is "match", it is determined that the data 21-1 acquired from the low-secure network 4-1 is reliable, and the NW identifier HNW of the high-secure network 3 and the NW identifier LNW1 of the low-secure network 4-1 are written in the table TB1 within the reliability information DB 13 in correspondence with the data identifier #DA of the data 21-1 (see FIG. 9A). The NW identifier LNW1 of the low-secure network 4-1 and information ("○") indicating permission of connection are paired and written in the table TB2 (see FIG. 9A).

Then, the communication terminal 1 acquires the collation information 22-2 via the high-secure network 3, acquires the data 21-2 via the low-secure network 4-2, and collates the acquired collation information 22-2 and data 21-2.

If the collation result is "mismatch", it is determined that the data 21-2 acquired from the low-secure network 4-2 is unreliable, and information ("−") indicating that there is no available network is written in the table TB1 within the reliability information DB 13 in correspondence with the data identifier #DB of the data 21-2 (see FIG. 9B). Further, the NW identifier LNW2 of the low-secure network 4-2 and information ("x") indicating inhibition of connection are paired and written in the table TB2 (see FIG. 9B).

After that, the communication terminal 1 acquires the collation information 22-3 via the high-secure network 3, acquires the data 21-3 via the low-secure network 4-3, and collates the acquired collation information 22-3 and data 21-3.

If the collation result is "mismatch", it is determined that the data 21-3 acquired from the low-secure network 4-3 is unreliable, and information ("−") indicating that there is no available network is written in the table TB1 within the reliability information DB 13 in correspondence with the data identifier #DC of the data 21-3 (see FIG. 9C). The NW identifier LNW3 of the low-secure network 4-3 and information ("x") indicating inhibition of connection are paired and written in the table TB2 (see FIG. 9C).

As described above, this system can prevent an attack on a server on a high-secure network. This is because data and collation information can be downloaded from a plurality of networks and collated to determine that data is not malicious one on a disguised server.

The reason for this is 1) the server can be reached from a plurality of networks and thus is the same one on the Internet, or 2) the server is disguised but data is not tampered and is not malicious one. This can prevent an attack on a high-secure network by malicious data on a low-secure network.

This system can also prevent access to a network whose DNS is spoofed. This is because whether to permit/inhibit access to a network is determined using reliability information in the reliability information DB.

In addition, this system can reduce the server installation cost. Conventionally, installing a reliable server requires the cost of certificate acquisition and the like. However, this system can improve the security level by only storing collation information on the server side without any other preparations.

Note that the first method of the first exemplary embodiment acquires the collation information 22 via the high-secure network 3, and the second method of the first exemplary embodiment acquires the collation information 22 via the low-secure network 4. However, it is also possible to acquire the data 21 from both the high-secure network 3 and low-secure network 4, generate hash values from the respective data 21 acquired from the high-secure network 3 and low-secure network 4, and compare the generated hash values (hash comparison). In this case, hash comparison need not always be executed, and binary comparison may be done to compare the binary values of the acquired data 21. This method will be called the third method of the first exemplary embodiment.

Second Exemplary Embodiment

Example which Adopts Third Method of First Exemplary Embodiment

FIG. 10 is a view showing the configuration of another exemplary embodiment (second exemplary embodiment) of an access control system according to the present invention. In the second exemplary embodiment, the communication terminal 1 will be referred to as 1A in order to discriminate it from a communication terminal used in an access control system according to the third exemplary embodiment (to be described later).

The communication terminal 1A includes a communication control unit 11, collation unit 12, reliability information DB 13, reliability information DB construction unit 14, storage unit 15, and data access unit 16.

In the access control system of the second exemplary embodiment, the communication control unit 11 of the communication terminal 1A is a control unit which connects to a network and communicates with it. The communication control unit 11 includes an NW identification unit 111 and communication unit 112.

The NW identification unit 111 is a means for identifying a connected network. Referring to FIG. 10, the NW identification unit 111 determines which of a high-secure network 3 and low-secure network 4 is connected to the communication terminal 1A. For example, the NW identification unit 111 determines a connected network based on the name of a connected network for 3G wireless communication, or based on the BSSID or ESSID of a connected access point for a wireless LAN.

The communication unit 112 is a means for acquiring data such as an application or content from a server 2 via either the high-secure network 3 or low-secure network 4. Examples are a 3G wireless network, Ethernet®, wireless LAN (IEEE802.11), and Bluetooth®.

The communication unit 112 has a function of delivering acquired data to the collation unit 12 together with the identifier of the data (data identifier) and the identifier of the network (NW identifier). The data identifier is, e.g., a URL, and can be represented by "http://foo.bar.com/sample.exe" or the like. Further, the communication unit 112 has a function of referring to reliability information in the reliability information DB 13 to determine whether to permit/inhibit access when the communication terminal 1 is to access a network. This function of the communication unit 112 corresponds to a network access permission/inhibition determination means in the present invention.

The collation unit 12 collates data based on the data, data identifier, and NW identifier which have been delivered from the communication unit 112. More specifically, the collation unit 12 determines whether the data matches downloaded data, and updates information in the reliability information DB 13 via the reliability information DB construction unit 14 in accordance with the collation result.

The storage unit 15 is a means for storing acquired data. When no data exists in the communication terminal 1 upon downloading data 21 from the server 2, the collation unit 12 regards the data as data downloaded for the first time, and stores it in the storage unit 15.

The reliability information DB 13 is a database which stores, as reliability information, correspondence between the data identifier and the NW identifier (table TB1), and the correspondence between the NW identifier and connection permission/inhibition information (table TB2).

The reliability information DB construction unit 14 is a means for updating the contents of the tables TB1 and TB2 in the reliability information DB 13 based on the data identifier, NW identifier, and collation result information which have been delivered from the collation unit 12.

The data access unit 16 has a function of determining whether to permit/inhibit access to data stored in the storage unit 15, by referring to the NW identifier (acquired from the NW identification unit 111) of a currently connected network and information in the reliability information DB 13 upon receiving a data access request from the user or application of the communication terminal 1. This function of the data access unit 16 corresponds to a data access permission/inhibition determination means in the present invention.

[Download of Data]

Figure 11:
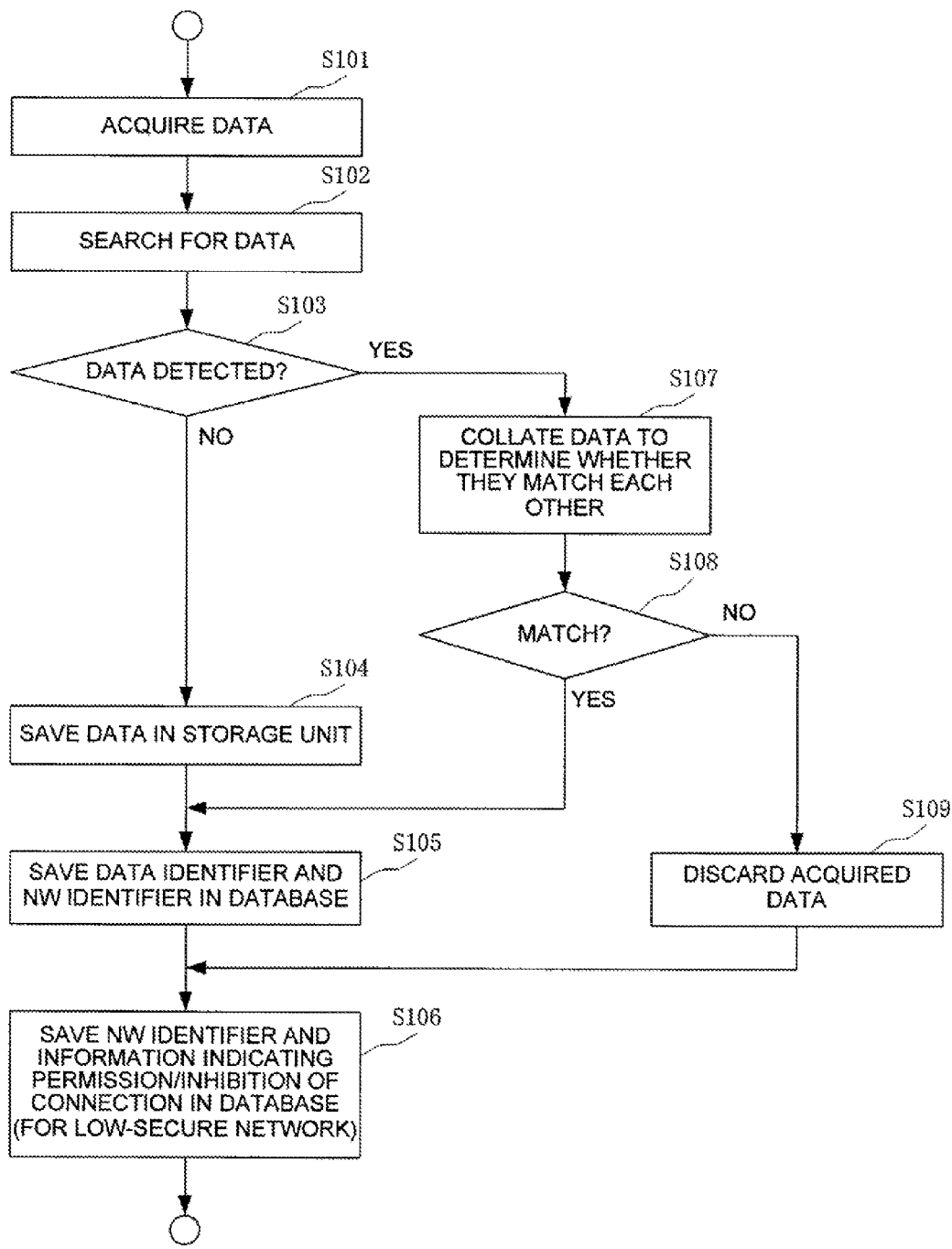
FIG. 11 is a flowchart showing a processing operation within a communication terminal in the access control system according to the second exemplary embodiment.

An operation when the user downloads the data 21 from the server 2 using the communication terminal 1A will be explained with reference to a flowchart shown in FIG. 11.

The communication terminal 1A acquires the data 21 from the server 2 using the communication unit 112 (step S101). At this time, the communication unit 112 acquires an NW identifier from the NW identification unit 111. That is, the communication unit 112 acquires the NW identifier of the network used to acquire the data 21. The communication unit 112 delivers, to the collation unit 12, the acquired data, the identifier of the data, and the NW identifier of the network used to acquire the data.

The collation unit 12 searches the storage unit 15 and reliability information DB 13, and checks whether data having the same data identifier has already existed (step S102). When the data 21 is acquired for the first time, information corresponding to the data identifier of the data 21 has not been stored yet in the storage unit 15 and reliability information DB 13.

In this case, in response to NO in step S103, the collation unit 12 saves the data 21 in the storage unit 15 (step S104). Also, the collation unit 12 writes the correspondence between the data identifier and the NW identifier in the table TB1 within the reliability information DB 13 via the reliability information DB construction unit 14 (step S105). If the NW identifier is the identifier of a low-secure network, the collation unit 12 writes the correspondence between the NW identifier and connection permission/inhibition information in the table TB2 within the reliability information DB 13 via the reliability information DB construction unit 14 (step S106).

In this example, assume that the data 21 is acquired first using the high-secure network 3. In this case, the NW identifier HNW of the high-secure network 3 is written in the table TB1 within the reliability information DB 13 in correspondence with the data identifier #DA of the data 21, as shown in FIG. 12.

Making data correspond to a network when the data is downloaded for the first time means that the data can run using the network "used for download". In other words, the operation of data during connection to a network other than one used for download is restricted (e.g., communication is rejected).

A case in which the same data (one having the same data identifier) is to be downloaded for the second and subsequent times will be explained. In this example, assume that the same data (one having the same data identifier) is to be acquired using the low-secure network 4. Also in this case, the communication unit 112 delivers the data, data identifier, and NW identifier to the collation unit 12.

The collation unit 12 searches the storage unit 15 and reliability information DB 13, and checks whether data having the same data identifier has already existed (step S102). Since this download is the second one, data having the same data identifier is detected.

In response to YES in step S103, the collation unit 12 determines whether data (previously downloaded data) which is saved in the storage unit 15 and has the same data identifier is the same as the currently acquired data (step S107). In this case, various collation methods are conceivable, including hash comparison of comparing the hash values of data, and binary comparison of comparing the binary values of data.

This is identical to collation of previously downloaded data and currently acquired data. That is, data acquired from the high-secure network 3 is collated with one acquired from the low-secure network 4.

If the data completely match each other in this collation (YES in step S108), it can be guaranteed that the currently acquired data is completely the same as the previously acquired data. In other words, the data has been acquired from the same server as that from which the data was acquired previously.

In this case, the collation unit 12 adds, to the table TB1 in the reliability information DB via the reliability information DB construction unit 14, the correspondence between the data identifier #DA of the currently acquired data 21 and the NW identifier LNW of the network used to acquire the data 21 (step S105: see FIG. 13). Also, the collation unit 12 writes, in the table TB2 within the reliability information DB 13 via the reliability information DB construction unit 14, the correspondence between the NW identifier LNW of the low-secure network 4 and information ("○") indicating permission of connection (step S106: see FIG. 13).

If the acquired data do not match each other (NO in step S108), the collation unit 12 discards the currently acquired data 21' (step S109). Further, the collation unit 12 writes, in the table TB2 within the reliability information DB 13 via the reliability information DB construction unit 14, the correspondence between the NW identifier LNW of the low-secure network 4 and information ("x") indicating inhibition of connection (step S106: see FIG. 14).

[Access to Downloaded Data]

Processing when accessing data downloaded in the storage unit 15 of the communication terminal 1 will be explained. Assume that a request to access the data 21 in the storage unit 15 is received from the user or application of the communication terminal 1.

At this time, the data access unit 16 searches the reliability information DB 13 using the data identifier #DA of the requested data 21 and an NW identifier acquired from the NW identification unit 111, and determines whether the data 21 saved in the storage unit 15 is accessible.

For example, assume that the contents of the table TB1 in the reliability information DB 13 are in a state as shown in FIG. 13. In this case, the data identifier #DA corresponds to the NW identifiers HNW and LNW in the table TB1 within the reliability information DB 13. Thus, the data access unit 16 permits access to the data 21 in the storage unit 15 upon connection to the high-secure network 3 and connection to the low-secure network 4.

To the contrary, when the contents of the table TB1 in the reliability information DB 13 are in a state as shown in FIG. 14, the data identifier #DA corresponds to only the NW identifier HNW in the table TB1 within the reliability information DB 13. The data access unit 16 therefore permits access to the data 21 in the storage unit 15 only upon connection to the high-secure network 3.

[Access to Network]

Processing when the communication terminal 1 is to connect to a network will be explained. When connecting to a network, the communication unit 112 acquires an NW identifier from the NW identification unit 111. The communication unit 112 searches the reliability information DB 13 using the acquired NW identifier, and determines whether to permit/inhibit access to the network.

For example, assume that the contents of the table TB2 in the reliability information DB 13 are in a state as shown in FIG. 13. In this case, the NW identifier LNW corresponds to information ("○") indicating permission of information in the table TB2 within the reliability information DB 13. Thus, the communication unit 112 permits access to the low-secure network 4.

In contrast, when the contents of the table TB2 in the reliability information DB 13 are in a state as shown in FIG. 14, the NW identifier LNW corresponds to information ("x") indicating inhibition of information in the table TB2 within the reliability information DB 13. Hence, the communication unit 112 inhibits access to the low-secure network 4.

Third Exemplary Embodiment

Example which Adopts First Method of First Exemplary Embodiment

The third exemplary embodiment will be described in detail below with reference to the accompanying drawings. In the second exemplary embodiment, when data is downloaded, the storage unit 15 and reliability information DB 13 are searched, and if data having the same data identifier exists, it is determined in step S108 of FIG. 11 whether these data are identical to each other. To the contrary, in the third exemplary embodiment, part of data is downloaded from a different network and collated to determine whether these data are identical.

FIG. 15 is a view showing the configuration of an access control system according to the third exemplary embodiment. In the third exemplary embodiment, the communication terminal 1 used will be referred to as 1B. In the communication terminal 1B, an attribute analysis unit 113 is added to a communication control unit 11, and a collation information generation unit 121 and data collation unit 122 are added to a collation unit 12.

Figure 16:
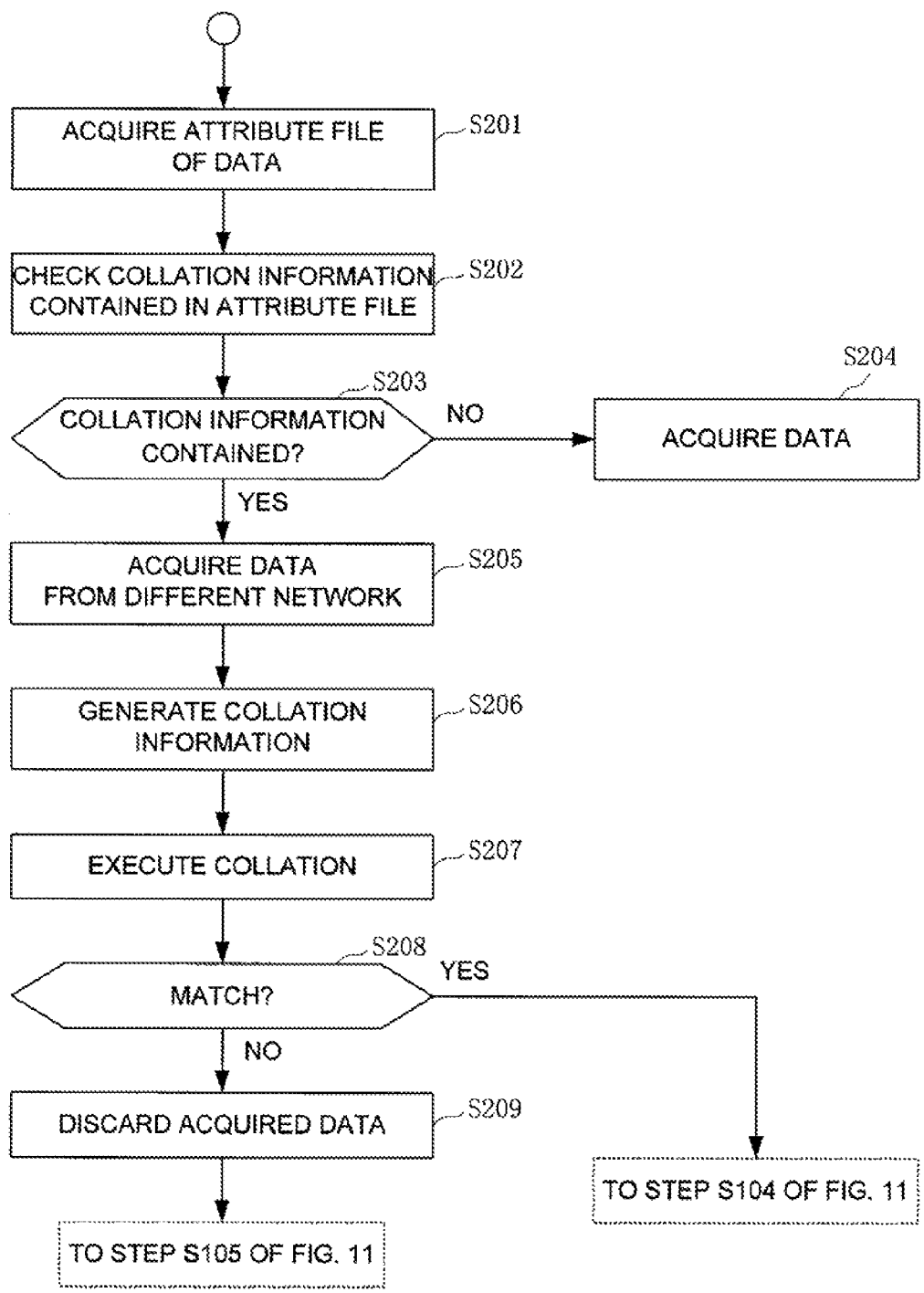
FIG. 16 is a flowchart showing a processing operation within a communication terminal in the access control system according to the third exemplary embodiment.

A communication unit 112 acquires an attribute file 23 of data 21 from a server 2 via a high-secure network 3 (step S201 in FIG. 16). The attribute analysis unit 113 determines whether collation information is contained in the acquired attribute file 23 (step S202).

In the third exemplary embodiment, collation information is data for specifying data, and may be a key issued by a download source or the hash value of data as described above. Also, collation information may be an irreversible value derived by a one-way function, like the hash value, but is not particularly limited. In this example, collation information is the hash value of data.

If no collation information is contained (NO in step S203), the body of the data 21 is acquired from the high-secure network 3 (step S204). If collation information is contained (YES in step S203), the body of the data 21 is acquired via a different network based on a URL described in the attribute file 23 (step S205). In this example, the body of the data 21 is acquired from a low-secure network 4 in accordance with the description (to be described later) of a network for use that is contained in the attribute file 23.

Then, the processing shifts to data collation processing. The collation information generation unit 121 generates collation information from the acquired data 21 (step S206). In this case, the collation information generation unit 121 calculates the hash value of the data 21, as described above.

The data collation unit 122 compares the hash value generated by the collation information generation unit 121 with the hash value acquired in step S202 (step S207). This means that data acquired from the high-secure network 3 is collated with one acquired from the low-secure network 4.

If the hash values do not match each other (NO in step S208), data is considered to have been acquired from an unintended server, and the acquired data is discarded (step S209). Subsequent processing is the same as processing in step S105 and subsequent steps of FIG. 11.

If the hash values match each other (YES in step S208), the data is regarded as the data 21 acquired from the same server 2. That is, it is determined that the data is not data 21' acquired from a spoofed server 2' on the low-secure network 4. Subsequent processing is the same as processing in step S104 and subsequent steps of FIG. 11.

The operation in the third exemplary embodiment will be described in more detail. In this example, download of a Java application in a mobile terminal (communication terminal) will be explained. Assume that the mobile terminal is connected to a cellular network serving as a high-secure network and a wireless LAN network serving as a low-secure network. The downloaded Java application assumes communication with the server 2 in FIG. 15 using either network during execution.

First, Java application download processing will be explained. In general, download of a Java application begins with download of an attribute file called an ADF file or JAB file. The mobile terminal verifies attributes such as the size and creating source of the Java application, and if necessary, inquires the user of the mobile terminal whether to download the Java application. If it is determined to download the Java application, the body of the Java application is downloaded to the mobile terminal. Processing will be explained according to this flow.

Referring to FIG. 15, the user of the communication terminal 1B selects a Java application to be downloaded by using an input device or the like (not shown). At this time, the communication unit 112 of the communication terminal 1B acquires the attribute file 23 of the selected Java application from the server 2. The attribute file 23 is acquired via the cellular network 3.

Figure 17:
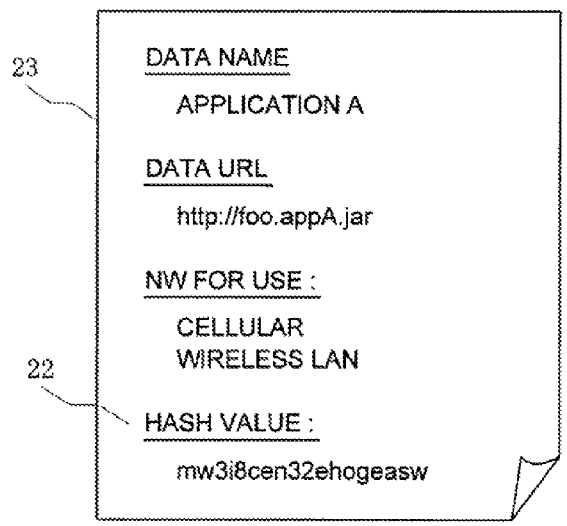
FIG. 17 is a view exemplifying an attribute file in the access control system according to the third exemplary embodiment.

The acquired attribute file 23 is delivered to the attribute analysis unit 113. FIG. 17 shows the attribute file 23 in the third exemplary embodiment. The attribute file 23 describes the URL of the data body and the type of network for use (cellular/wireless LAN in this example) in addition to the data name. Further, the attribute file 23 describes the hash value of the data body as the collation information 22. A hash function for generating a hash value is not particularly limited, and may be one determined in advance between the server 2 and the communication terminal 1B, or one defined by a communication provider who manages the cellular network 3. The hash function may be described in the attribute file 23.

The attribute analysis unit 113 verifies the attribute file 23 and determines whether to use the wireless LAN network 4. In the third exemplary embodiment, the hash value is described as the collation information 22, and the wireless LAN is described as a network for use, as shown in FIG. 17. Thus, the attribute analysis unit 113 determines that the Java application is one using the wireless LAN network 4. The communication unit 112 stores the acquired attribute file 23 in a storage unit 15.

Figure 18:
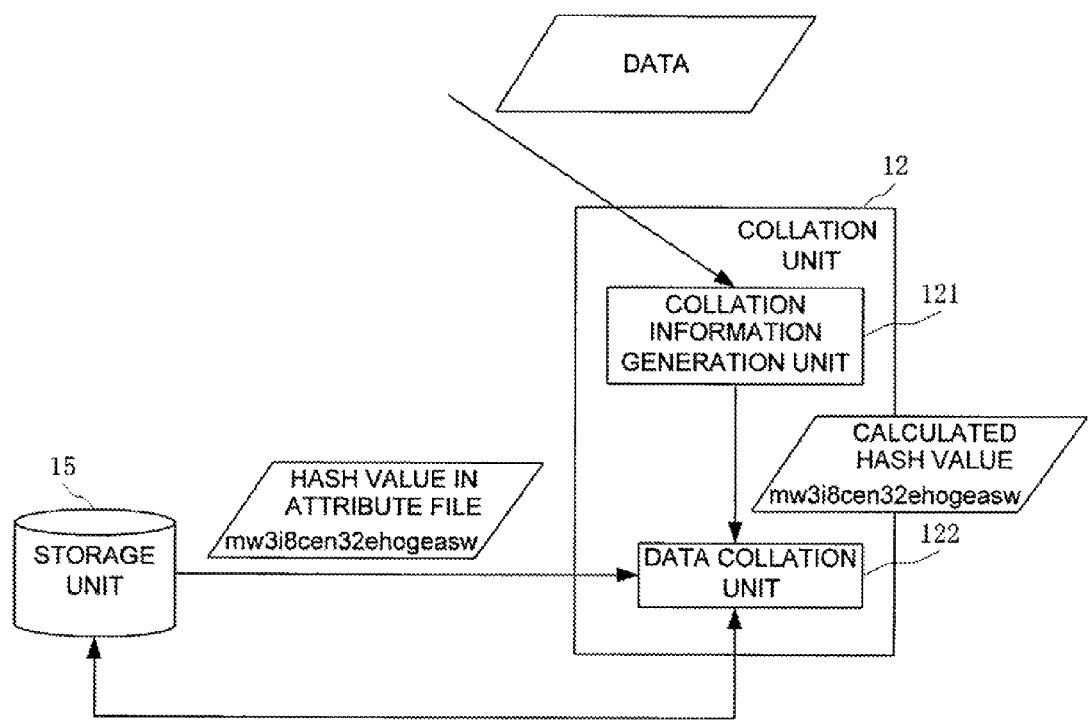
FIG. 18 is a view showing a concrete example of collation processing in the access control system according to the third exemplary embodiment.

Then, the body (application A) of the data 21 is acquired via the wireless LAN network 4 based on the data URL in the attribute file 23. The collation information generation unit 121 calculates the hash value of the acquired application A, and the data collation unit 122 collates it with the hash value in the attribute file 23. FIG. 18 shows this state.

If the hash value in the attribute file 23 matches the calculated hash value, the data collation unit 122 determines that the acquired application A has not been tampered and is reliable, and thus permits the use on both the cellular network 3 and wireless LAN network 4.

Figure 19:
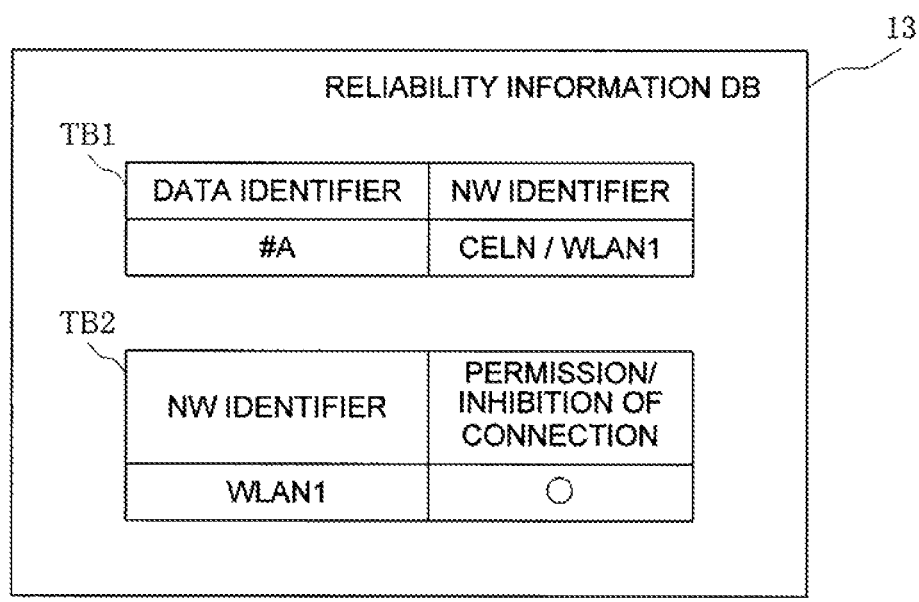
FIG. 19 is a view exemplifying write of reliability information in the reliability information DB when the collation result is "match" in the access control system according to the third exemplary embodiment.

More specifically, the NW identifier CELN of the cellular network 3 and the NW identifier WLAN1 of the wireless LAN network 4 are written in a table TB1 of a reliability information DB 13 in correspondence with the data identifier #A of the application A. Also, the correspondence between the NW identifier WLAN1 of the wireless LAN network 4 and information ("○") indicating permission of information is written in a table TB2 of the reliability information DB 13. FIG. 19 shows this state. The acquired application A is saved in the storage unit 15.

Next, processing when executing the downloaded application A will be explained. A data access unit 16 accepts a request to access the application A, searches the reliability information DB 13 using the data identifier #A of the application A and an NW identifier acquired from the NW identification unit 111, and determines whether the application A in the storage unit 15 is accessible.

In this case, the data identifier #A corresponds to the NW identifiers CELN and WLAN1 in the table TB1 within the reliability information DB 13. Thus, the data access unit 16 permits access to the application A in the storage unit 15 upon connection to the cellular network 3 and connection to the wireless LAN network 4.

The communication unit 112 acquires an NW identifier from the NW identification unit 111, searches the reliability information DB 13 using the acquired NW identifier, and determines whether to permit/inhibit access to the network. In this case, the NW identifier WLAN1 corresponds to information ("○") indicating permission of connection in the table TB2 within the reliability information DB 13. Hence, the communication unit 112 permits access to the wireless LAN network 4. As for the cellular network 3, access to this network is always permitted.

Accordingly, the communication terminal 1B can use the application A in the storage unit 15 by using the cellular network 3 and wireless LAN network 4 simultaneously or by switching.

Note that the third exemplary embodiment has exemplified a case in which the first method of the first exemplary embodiment is employed. Similarly, the third exemplary embodiment can also adopt the second method of the first exemplary embodiment. In this case, the communication unit 112 acquires the attribute file 23 from the server 2 via the low-secure network 4, and acquires the data 21 from the server 2 via the high-secure network 3.

In the above-described first to third exemplary embodiments, the downloaded data 21 communicates with only the server 2, but the present invention is not limited to this. That is, when it is determined that the server 2 is reliable, it is determined that even a server within the same subnet or domain is reliable, and communication may be permitted. In this case, the data 21 can communicate with a plurality of servers.

When it is determined that a server different from the server 2 is reliable, communication with this server may be permitted. In this case, the data 21 can communicate not only with the server 2 but also with a plurality of servers.

In the above-described first to third exemplary embodiments, when a mismatch occurs in collation processing, access to a low-secure network having the NW identifier is inhibited, but the present invention is not limited to this. That is, return processing may be done such that collation processing is executed again after the lapse of an arbitrary time, and if a match occurs, access is permitted.

In the above-described first to third exemplary embodiments, determination of whether to permit/inhibit access to data and determination of whether to permit/inhibit access to a network are combined and executed. However, whether to permit/inhibit access to data may be singly determined, or whether to permit/inhibit access to a network may be singly determined.

When singly determining whether to permit/inhibit access to a network, the data 21' acquired from the spoofed low-secure network 4 may be used on a high-secure network, and is discarded without saving it in the communication terminal 1.

INDUSTRIAL APPLICABILITY

The access control system, access control method, and communication terminal according to the present invention are available in various fields as an access control system, access control method, and communication terminal for controlling access to data such as an application or content, and a network.

The invention claimed is:

1. An access control system comprising a first network, a second network lower in security than said first network, a communication terminal connectable to said first network and said second network, and a server which is connected to said first network and said second network, transmits collation information which is information generated from data and identifies the data to said communication terminal via one of said first network and said second network, and transmits the data to said communication terminal via another one of said first network and said second network, said communication terminal comprising:
    a communication control unit that acquires, from the server via one of the first network and the second network, the collation information, and acquires the data from the server via another one of the first network and the second network;
    a collation unit that collates the collation information and the data which are acquired by the communication control unit; and
    a reliability information DB construction unit that constructs, based on a collation result of said collation unit, a reliability information DB as a database of information indicating reliability of access to a resource.

2. An access control system according to claim 1, wherein said communication terminal comprises a data access permission/inhibition determination unit that uses, as a resource, data downloaded via one network out of said first network and said second network, and refers to information in the reliability information DB to determine whether to permit/inhibit access to the resource.

3. An access control system according to claim 1, wherein said communication terminal comprises a network access permission/inhibition determination unit that uses at least said second network as a resource, and refers to information in the reliability information DB to determine whether to permit/inhibit access to the resource.

4. An access control system according to claim 1, wherein said communication terminal comprises:
    a data access permission/inhibition determination unit that uses, as a resource, data downloaded via one network out of said first network and said second network, and refers to information in the reliability information DB to determine whether to permit/inhibit access to the resource; and
    a network access permission/inhibition determination unit that uses at least said second network as a resource, and refers to information in the reliability information DB to determine whether to permit/inhibit access to the resource.

5. An access control system according to claim 1, wherein said collation unit of said communication terminal collates a hash value of data acquired from one network out of said first network and said second network with a hash value of data acquired from the other network.

6. An access control method comprising the steps of:
acquiring, from a server via one of a first network and a second network lower in security than the first network, collation information generated from data and identifies that data, wherein the server is connected to said first network and said second network, transmits the collation information to a communication terminal via one of said first network and said second network, and transmits the data to said communication terminal via another one of said first network and said second network;
acquiring the data from the server via another one of the first network and the second network;
collating the collation information and the acquired data; and
constructing, based on a result of the collation, a reliability information DB as a database of information indicating reliability of access to a resource.

7. An access control method according to claim 6, further comprising the step of using, as a resource, data downloaded via one network out of the first network and the second network, and referring to information in the reliability information DB to determine whether to permit/inhibit access to the resource.

8. An access control method according to claim 6, further comprising the step of using at least the second network as a resource, and referring to information in the reliability information DB to determine whether to permit/inhibit access to the resource.

9. An access control method according to claim 6, further comprising the steps of:
using, as a resource, data downloaded via one network out of the first network and the second network, and referring to information in the reliability information DB to determine whether to permit/inhibit access to the resource; and
using at least the second network as a resource, and referring to information in the reliability information DB to determine whether to permit/inhibit access to the resource.

10. An access control method according to claim 6, wherein the step of collating the collation information acquired for the data from said one network with the data acquired from the other network includes collating a hash value of data acquired from said one network with a hash value of data acquired from the other network.

11. A communication terminal comprising:
a communication control unit that acquires, from a server via one of a first network and a second network lower in security than the first network, collation information that is generated from data and identifies said data, and acquires the data from the server via another one of the first network and the second network, wherein the server is connected to said first network and said second network, transmits the collation information to said communication terminal via one of said first network and said second network, and transmits the data to said communication terminal via another one of said first network and said second network;
a collation unit that collates the collation information and the data which are acquired by the communication control unit; and
a reliability information DB construction unit that constructs, based on a result of the collation, a reliability information DB as a database of information indicating reliability of access to a resource.

12. A communication terminal according to claim 11, further comprising a data access permission/inhibition determination unit that uses, as a resource, data downloaded via one network out of the first network and the second network, and refers to information in the reliability information DB to determine whether to permit/inhibit access to the resource.

13. A communication terminal according to claim 11, further comprising a network access permission/inhibition determination unit that uses at least the second network as a resource, and refers to information in the reliability information DB to determine whether to permit/inhibit access to the resource.

14. A communication terminal according to claim 11, further comprising:
a data access permission/inhibition determination unit that uses, as a resource, data downloaded via one network out of the first network and the second network, and refers to information in the reliability information DB to determine whether to permit/inhibit access to the resource; and
a network access permission/inhibition determination unit that uses at least the second network as a resource, and refers to information in the reliability information DB to determine whether to permit/inhibit access to the resource.

15. A communication terminal according to claim 11, wherein said collation unit collates a hash value of data acquired from one network out of the first network and the second network with a hash value of data acquired from the other network.

16. A communication terminal comprising:
communication control means for acquiring, from a server via one of a first network and a second network lower in security than the first network, collation information that is generated from data and identifies said data, wherein the server is connected to said first network and said second network, transmits the collation information to said communication terminal via one of said first network and said second network, and transmits the data to said communication terminal via another one of said first network and said second network;
data acquisition means for acquiring data from the server via another one of the first network and the second network;
collation means for collating the collation information and the data which are acquired; and
reliability information DB construction means for constructing, based on a result of the collation, a reliability information DB as a database of information indicating reliability of access to a resource.

* * * * *